(No Model.)
W. W. WINEGAR.
Attachment to Grain Drill.
No. 235,838. Patented Dec. 21, 1880.
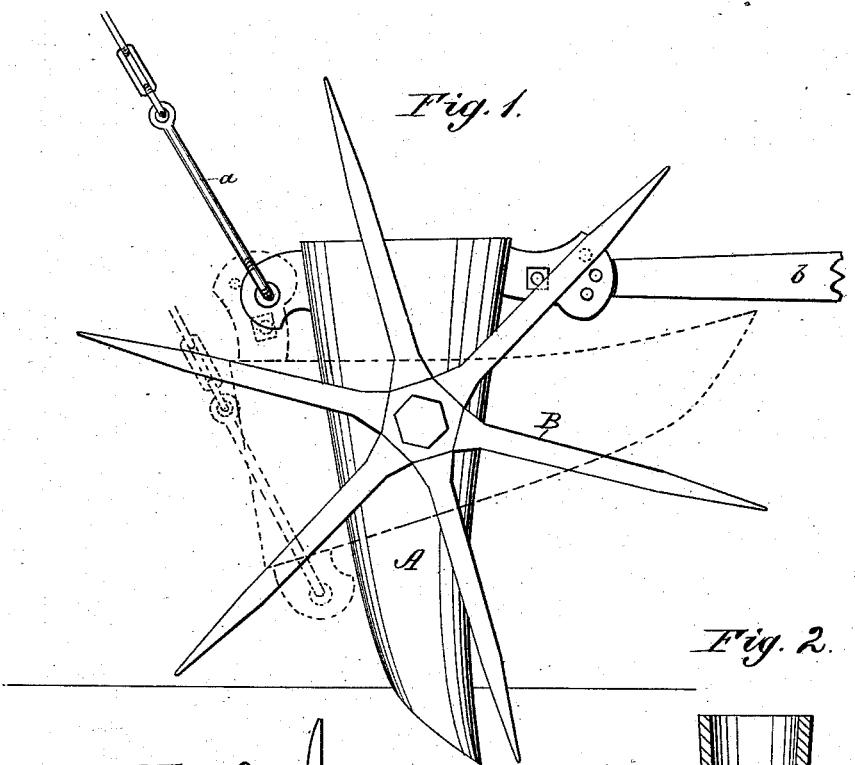
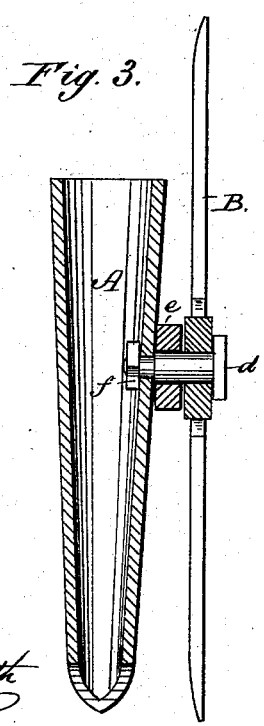
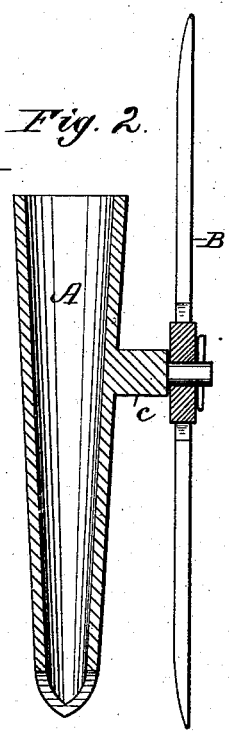
WITNESSES:
W. W. Hollingsworth
Edw. W. Byrn
INVENTOR:
W. W. Winegar
BY
ATTORNEYS.

UNITED STATES PATENT OFFICE.

WILLIAM W. WINEGAR, OF CHAMBERSBURG, ILLINOIS.

ATTACHMENT TO GRAIN-DRILLS.

SPECIFICATION forming part of Letters Patent No. 235,838, dated December 21, 1880.

Application filed November 8, 1880. (No model.)

*To all whom it may concern:*

Be it known that I, WILLIAM W. WINEGAR, of Chambersburg, in the county of Pike and State of Illinois, have invented a new and Improved Attachment to Grain-Drills; and I do hereby declare that the following is a full, clear, and exact description of the same, reference being had to the accompanying drawings, forming part of this specification, in which—

Figure 1 is a side elevation of the drill-tooth and its attachment. Fig. 2 is a vertical section at right angles to the plane of the wheels, showing the form in which the drill-tooth is made to receive the wheel. Fig. 3 is a similar view of a modification, showing the attachment of the wheel to drill-teeth already in use.

The object of my invention is to provide a means for cleaning grain-drill teeth of straw, grass, and other accumulations which may gather on the front of the same. This has heretofore been attempted by means of a pronged or spiked wheel arranged between the drill-teeth, which wheel runs in contact with the ground, and the prongs of which pin the accumulated straw or grass to the ground, so that it cannot be carried along by the machine, but is forced back between the teeth or held while the teeth drag through or over it.

My invention consists in combining these pronged wheels with the hollow drill-teeth by mounting said wheels upon bearings fixed directly to the sides of said teeth, whereby the wheels have the same loose adjustment of the teeth, rising and falling with the same, and always keeping in proper relation to the bottom of the tooth to perform its functions, and whereby, also, the drill-tooth is supported in backing and the upper end of the tooth prevented from catching in the ground, as hereinafter more fully described.

In the drawings, A represents a hollow drill-tooth, which is loosely suspended by chain-link *a* in the rear, and in front is attached to the draft-bar *b*, while its lower end drags upon the ground. To the side of this drill-tooth is connected the pronged or spiked wheel B at such a distance from its lower end that its prongs project a little below the lower end of the tooth, so as to enter the ground sufficiently deep and pin the accumulated grass down while the teeth pass through it. These wheels revolve loosely, and they may be put on every one of the drill-teeth, or only on every other one, as the circumstances of the case may require.

In constructing new drills or new drill-teeth, I propose to attach the wheel to the tooth by casting on the side of the hollow tooth a stud, *c*, as in Fig. 2, projecting a sufficient distance from the tooth and having a shouldered and perforated end, by means of which the pronged wheel may be sustained and allowed to revolve, the wheel in that case being loosely held between the shoulder of the stud and a key or pin which is passed through the hole in the end of the stud.

In applying my invention to old drills having the old form of teeth, I perforate the side walls of the tooth, as in Fig. 3, and employ a shouldered bolt, *d*, a block or washer, *e*, and a nut, *f*, which latter fits upon the threaded end of the bolt inside the tooth, holding it and the bolt firmly together, and leaving the wheel free to revolve between the block or washer *e* and the head of the bolt. Both this arrangement and the first mentioned, it will be seen, readily permit the wheel to be detached when it is not required to be used.

In pointing out the distinctive merits of my invention, I would state that when thus combined with the tooth by direct attachment thereto no special supports for the wheels are necessary; and, besides, each wheel maintains a constant position to the bottom of its tooth for all changes in the position of the tooth in rising and falling to the inequalities of the ground. As the wheel therefore partakes of the automatic adjustment of the tooth, it better performs its function than if it were carried by special supports, as has been heretofore done. Furthermore, in backing the backlash on the draft-bars throws the tooth into the position shown in dotted lines, in which position the chain-connection strikes the ground and causes the top of the tooth to be jammed into the ground. With my arrangement, when the tooth is thrown into this position its top does not strike the ground, but the tooth rides backward on the pronged wheel until the draft-strain is again applied.

Having thus described my invention, what I claim as new is—

The combination, with a drill-tooth, of a pronged or spiked wheel attached directly to the side of the tooth and carried by the latter, substantially as and for the purpose described.

WILLIAM W. WINEGAR.

Witnesses:
 EDWD. W. BYRN,
 CHAS. A. PETTIT.